March 20, 1945.  E. A. STALKER  2,372,030
ROTARY WING AIRCRAFT
Filed Feb. 13, 1941
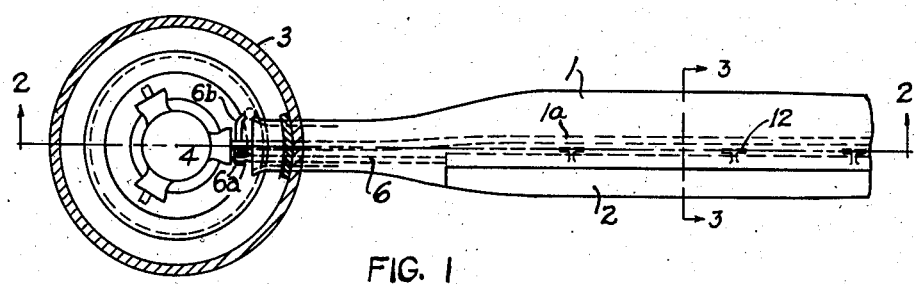
FIG. 1
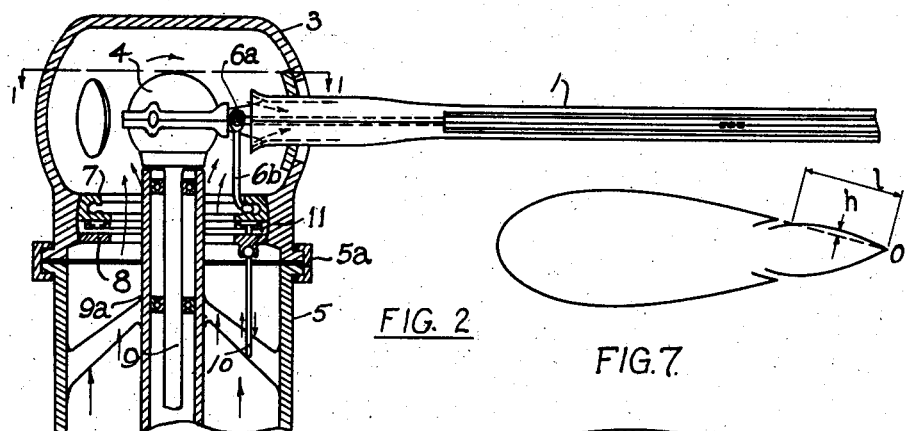
FIG. 2
FIG. 7
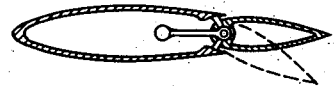
FIG. 6
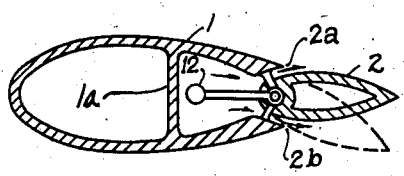
FIG. 3
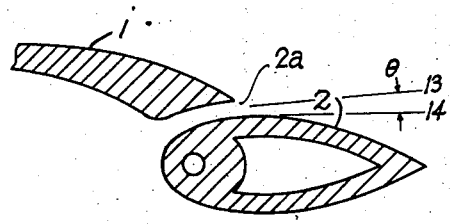
FIG. 5
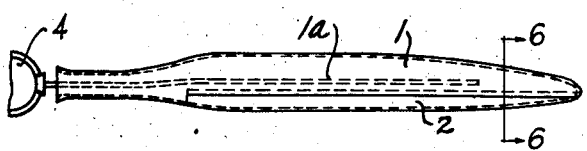
FIG 4
INVENTOR
Edward A. Stalker Patented Mar. 20, 1945

2,372,030

UNITED STATES PATENT OFFICE 2,372,030

ROTARY WING AIRCRAFT

Edward A. Stalker, Ann Arbor, Mich., assignor to The Dow Chemical Company, Midland, Mich., a corporation of Michigan Application February 13, 1941, Serial No. 378,753

11 Claims. (Cl. 244—17)

My invention relates to aircraft sustained by a rotating wing and has for its objects, first to provide, in a rotary wing propelled by a jet, a means to control the jet at the exit; second to provide a rotary wing with a flap and slot to improve the speed range; third to provide a means of governing the flap and slot flow in a coordinated relationship. Other objects will appear from the description and drawing.

I accomplish the above objects by the means illustrated in the accompanying drawing in which:

Figure 1 is a fragmentary plan view partly in section of the helicopter wing and hub;

Figure 2 is a fragmentary vertical section of the hub taken along the line 2—2 in Figure 1;

Figure 3 is vertical section taken along the line 3—3 in Figure 1;

Figure 4 is a plan view of a wing with a fragment of the hub;

Figure 5 is an enlarged fragmentary sectional view of the wing and flap;

Figure 6 is a section along the line 6—6 in Figure 4; and

Figure 7 pertains to wing section proportions.

In my United States Patent No. 2,084,464 of 1937 means were disclosed for controlling the flow to upper and lower surface slots by means of a valve at the inlet of the wing in the hub.

The present invention discloses a valve means at the exit of the passage through the wing, that is at the discharge slots in the wing surface. This presents a far more efficient device because turbulence at the valve is avoided. In the patent mentioned the inlet valve restricted the flow by restricting the passage and causing turbulence in the flow. There was a loss due to the transformation of the steady flow into turbulence and also a greater resistance to flow along the wing passage because the flow was turbulent.

Referring to the drawing the wing is 1, the wing flap is 2 and the hub housing is 3. It is rotatably supported on the duct 5, the two being joined by the ring 5a. The wing span 1a has at the hub end a spherical segment supported in the hub 4 to permit it to oscillate vertically and it is free to oscillate in this manner as disclosed in the patent mentioned above and in doing so imparts an oscillation to the flap 2. It will be observed that the flap is hinged to the fore part of the wing and has an arm 6 extending into the hub housing. A connecting rod 6b is hinged to it at 6a and extends downward to a slot in the control plate 7. The end of 6b is ball shaped and lies ahead of the spanwise center line of the wing as shown in Figure 1. If the wing moves up vertically the flap is raised at the trailing edge so as to create a lift force increment acting downward to stop the up motion of the wing. If the wing moves downward the flap action tends to stop the motion. In the same instances one of the wing slots 2a or 2b is opened on the correct side so that the lift induced by the slot flow aids in stopping the wing motion.

The ball of the rod 6b slides in a groove in the ring 7 as shown in Figure 2.

In order to control the aircraft the pilot's control is connected by a ball and socket to the plate 8 by means of the rod 10. This plate is rotatably connected to the control plate 7 by means of T-shaped lugs 11 slideably fitting in a slot on the under side of plate 7. When the rod 10 is moved the flap is rotated relative to the wing and the wing takes up a path of rotation inclined to the horizontal. The lift vector then passes to one side of the center of gravity causing the aircraft to tilt.

While the control displacement is being applied to the flap, the wing is also free to oscillate so as to alter the lift to compensate for gyroscopic moments or for the difference in relative wind velocity between advancing and retreating positions.

Another rod similar to 10 is joined to the plate 8, 90 degrees around the circumference from 10. The two rods then provide for rolling and pitching of the aircraft respectively.

The shaft 9 supporting the hub 4 is supported on suitable bearings in the shaft housing 9a as disclosed in the patent already mentioned.

The duct 5 is in communication with a blower and conducts fluid from it to the hub housing 2. From there the fluid enters the wing interior and proceeds to the wing slots 2a and 2b. The jets issuing from the slots propel the wing and also provide a means of controlling it.

The flap 2 has a weight 12 ahead of the hinge so that the mass is balanced about the hinge center line. This excludes any motion of the flap relative to the wing due to inertia effects.

A feature of this invention is the provision of the means of cambering the wing at the same time that the slot is opened to its greatest extent. This is an important feature since the flap and slot flow then cooperate to provide a lift increase greater than the effect of either alone.

In a rotary wing aircraft one of the problems is to sustain the retreating blade. In present practice the forward speed of the aircraft cannot exceed from 0.4 to 0.5 of the rotary tip speed of the blade because the retreating blade will have too low a relative wind velocity. Hence there is a definite upper limit to the top speed of rotary wing aircraft with present wings. I have found it possible to operate with a greater ratio than 0.5 if the wing is provided with boundary layer control but the effectiveness of such control depends on the ability to camber the wing an appreciable amount so as to deflect the slot flow downward. To influence the slot flow efficiently the slot must be near the flap.

Another feature is that the flap has a thickness such that the contour of the wing section with the flap mentioned has a reversal of curvature. This flap shape provides a curvature to the wing with the flap depressed which has a generous radius at all localities as indicated by the dotted lines in Figures 3 and 6.

It will now be understood that I have disclosed a means of rotating a helicopter wing by jets issuing from the slots 2a and 2b and that I provide a means of controlling the slot flows at the locality of issuance from the wing. The control of the slot flow and the actuation of the flap are coordinated. Furthermore the wing and flap present such contours that the slot flow is utilized very effectively in creating lift.

The rise $h$ (Figure 7) of the arc of the flap contour should be about 10 per cent of the length $l$ for a wing section whose maximum thickness is less than 20 per cent of the chord length of the wing. The rise $h$ is measured above the line drawn through the trailing edge 0 and touching the exterior contour of the fore body. As the wing is thickened the rise $h$ can be diminished.

It is a feature of this invention that a thin wing is fitted with a type of flap that yields a curvature of large radius when the flap is depressed.

Preferably the height $h$ should be greater than 2 per cent of $l$ for any thickness and should be less than 30 per cent.

The discharge slot should direct its jet along the surface of the wing. To do this the axis of the slot should lie close to the tangent to the wing surface at the slot exit. In Figure 5 the slot axis is 13 and the tangent is 14. The angle $\theta$ is preferably less than 25 degrees.

It is to be understood that while I have illustrated a specific form of the invention I do not intend to limit myself to this exact form but intend to claim my invention broadly as indicated by the appended claims.

I claim:

1. In combination in a direct lift aircraft, a hollow hub, a wing to support the aircraft and having a spanwise passage therewithin extending along a major portion of the span, means to support the wing on said hub for rotation about an upright axis, said wing having the inlet of said passage at its axis end communicating with said hollow hub, power means to induce a fluid flow through said inlet into said passage, said wing having an adjustable flap extending spanwise along a major portion of the outer semi-span of the upper surface, the upper wall of the wing substantially overlapping the nose of the flap to form therebetween a discharge slot with a slot inlet into said passage and a slot exit on the upper side of the wing, said flap progressively increasing the cross sectional area of said slot exit when the rear edge of the flap is depressed and reducing the area of said slot exit when the rear edge is elevated, the walls of said passage being substantially smooth and free of turbulence inducing restrictions from the inlet thereof to said slot, and means to adjust the flap and concurrently to control the volume of flow through said slot with respect to orbital positions on opposite sides of said axis of rotation, said flap serving to control the slot flow to preclude turbulence within the wing upstream from said slot exit.

2. In combination in a direct lift aircraft, a hollow hub, a wing to support the aircraft and having a spanwise passage therewithin extending along a major portion of the span, means including said hub to support the wing for rotation about an upright axis, said wing having the inlet of said passage into the hub at the axis end of said passage, power means to induce a fluid flow through said inlet into said passage, said wing having a spanwise flap extending along a major portion of the outer semi-span of the wing and movable to form a spanwise extensive discharge slot in the upper surface between the flap and the adjacent upper wall of the wing, said upper wall overlapping the flap to direct the slot axis rearward substantially along the flap surface, said flap having a rounded nose portion forming a throat of substantially uniform width at the inlet end of said slot, and means for mounting said flap on said wing for adjustment relative thereto providing for increase in the exit area of said slot as the flap is lowered to discharge a larger volume of air therethrough.

3. In combination in a direct lift aircraft, a hollow hub, a wing to support the aircraft and having a spanwise passage therewithin extending along a major portion of the span, means including said hub to support the wing for rotation about an upright axis, said wing having the inlet of said passage at its axis end into said hub, power means to induce a fluid flow through said inlet into said passage, said passage having a smooth interior substantially free of turbulence producing restrictions, a flap rotatable about a spanwise axis and supported on said wing, the upper wall of said wing overlapping the nose of said flap a substantial distance to form therebetween a rearward directed slot with its exit at the upper side of the wing and extensive along a major portion of the outer semi-span of the wing, said slot being in communication with said passage to emit a fluid jet, the walls of said slot defining a slot axis directed rearward substantially along the wing surface, and means to move the trailing edge of the flap downward, said flap having a rounded nose portion providing a throat of substantially uniform width at the inlet end of said slot, and means for raising and lowering said flap to decrease and increase respectively the width of the slot exit relative to the width of said throat to control the volume of the flow discharged therethrough.

4. In combination in a direct lift aircraft, a hollow hub, a wing to support the aircraft and having a spanwise passage therewithin extending along a major portion of the span, means to support the hub and wing for rotation about an upright axis, said wing having the inlet of said passage at its axis end into said hub, power means to induce a fluid flow through said inlet into said passage, said wing having a rearward directed discharge slot with its exit in the upper surface and its inlet in communication with said passage for the emission of a propulsive jet rearward, the walls of said slot overlapping along a substantial chordwise distance to define a slot axis directed rearward substantially along the wing surface, said wing having a flap rotatable about a spanwise axis, and means extending outward from the hub to control the slot area and depress the trailing edge of the flap coincidentally, the walls of said passage between its said inlet and said slot being substantially smooth and free of step formation and objectionable turbulence producing restrictions, the nose of said wing being substantially closed against an influx of wind into its interior along a major portion of the wing span, said slot structure serving to exclude turbulence in the passage flow.

5. In combination in direct lift aircraft, a hub rotatable about an upright axis, a wing main body supported on said hub for rotation about said axis through advancing and retreating positions, a flap adjustably mounted at the rear of said body near its outer end to form a wing therewith, a wall of said body being spaced from the wall of said flap to form a rearward opening slot therebetween leading chordwise into said wing interior, said slot walls being disposed to direct a jet from the slot rearward substantially along said flap surface and increasing in volume as said flap is depressed, means defining a passage within the wing in communication with said slot and leading substantially spanwise to an inlet at the axis end of said wing, the wall of said passage being substantially closed to the flow therethrough of the relative wind, power driven blower means within the aircraft in communication with said inlet to force a spanwise flow through said passage and out said slot to rotate said wing by jet action, and means controlled in response to the rotation of the wing about said upright axis for moving said flap relatively upward at the trailing edge relative to said main body when the wing is in the said advancing position and relatively downward in said retreating position with an accompanying decrease and increase respectively in the volume of the jet flow through said slot.

6. In combination in a direct lift aircraft, a hub rotatable about an upright axis, a wing main body supported on said hub for rotation about said axis through advancing and retreating positions, a flap adjustably mounted on said body at the rear thereof near its outer end to form a wing therewith, the walls of said body being spaced from said flap walls to form a rearward opening slot above and below said flap for the discharge of fluid rearward along the flap surfaces, the discharge opening of said slots being controlled inversely and with the lowering of the upper slot increasing upon the lowering of said flap, said slots leading chordwise into the wing interior, means defining a passage within the wing in communication with said slots and leading substantially spanwise to an inlet at the axis end of said wing, the wall of said passage being substantially closed to the flow of the relative wind through said wall and being relatively smooth and free of turbulence producing restrictions, power driven blower means within the aircraft in communication with said inlet to force a spanwise flow in said passage and out said slots, and means to raise and lower said flap at the trailing edge to alter the slot widths differentially between said upper and lower slots, the walls of said lower slot retaining their rearward direction to direct the slot flow therethrough toward the trailing edge of said flap substantially along the flap under surface.

7. In combination in a direct lift aircraft, a hub rotatable about an upright axis, a wing main body supported on said hub for rotation about said axis through advancing and retreating positions, a flap adjustably mounted on said body near its outer end to form a wing therewith, the walls of said body being spaced from said flap walls to form a rearward opening slot above and below said flap for the discharge of fluid rearward along the flap surfaces, the size of the slot above the flap increasing and that of the slot below the flap decreasing upon depression of the flap, said slots leading chordwise into the wing interior, means defining a passage within the wing in communication with said slots and leading substantially spanwise to an inlet at the axis end of said wing, the wall of said passage being substantially closed to the flow of the relative wind through said wall, power driven blower means within the aircraft in communication with said inlet to force a spanwise flow in said passage and out said slots, and means to move said flap upward at the trailing edge to reduce the volume of flow of the jets from said slots when the wing is in the advancing position and downward with increased volume of flow in the retreating position of the wing.

8. In combination in a direct lift aircraft, a hub, means supporting the hub for rotation about an upright axis, a wing supported on said hub for rotation therewith, said wing having a discharge slot extending spanwise along a substantial portion thereof, the walls of said slot being formed to direct the slot flow of air rearwardly of said wing, said slot leading forward into said wing with a substantially continuously and smoothly expanding cross-sectional area, means defining a spanwise passage within said wing communicating with said slot and leading to an opening at the axis end of said wing, the surface of said passage being substantially closed to the inflow of the relative wind, power blower means in the aircraft in communication with said inlet to force a flow of air through said passage and out said slot to rotate the wing about said axis by jet reaction, and means to vary the volume of flow through said slot and the force of the jet reaction by changing the exit area thereof, said passage at its inlet being free of substantial obstructions to provide free flow of fluid for all degrees of operation of said flow varying means.

9. In combination in a direct lift aircraft, a hub, means supporting the hub for rotation about an upright axis, a wing main body supported on said hub for rotation therewith, a flap adjustably supported on said main body near its outer end to form a wing therewith, said main body having a wall lapping a wall of said flap and spaced therefrom to form a rearward opening slot extending spanwise along a substantial portion of said wing span, the size of said slot opening increasing upon the lowering of said flap providing for increased volume of flow therethrough, said slot leading noseward into said wing with a substantially continuously increasing cross-sectional area, means defining a passage within the wing communicating with said slot and terminating in an inlet opening at the axis end of said wing, power driven blower means within the aircraft in communication with said inlet to force a flow of air spanwise through said passage and out said slot to rotate the wing about said axis by jet reaction, and means to lower said flap to provide a highly cambered wing surface and to vary the width of said discharge slot and the volume of air discharged therethrough.

10. In combination in a direct lift aircraft, a hub rotatable about an upright axis, a wing main body supported on said hub for rotation about said axis through advancing and retreating positions, a flap adjustably mounted on said body near its outer end to form a wing therewith, the walls of said body being spaced from said flap walls to form a rearward opening slot above said flap for the discharge of fluid rearward along the flap surface, the size of the slot above the flap increasing upon depression of the flap, said slot leading chordwise into the wing interior, means defining a passage within the wing in communication with said slot and leading substantially spanwise to an inlet at the axis end of said wing, the wall of said passage being substantially closed to the flow of the relative wind through said wall, power driven blower means within the aircraft in communication with said inlet to force a spanwise flow in said passage and out said slot, and means to move said flap upward at the trailing edge to reduce the volume of flow of the jets from said slots when the wing is in the advancing position and downward with increased volume of flow in the retreating position of the wing.

11. In combination in a direct lift aircraft, a hub, means supporting the hub for rotation about an upright axis, a wing main body, a flap, means for adjustably supporting said flap on said body to form a wing, means supporting said wing on said hub for rotation therewith, said wing having a normal position in substantial alignment with said body and being adjustable to a raised and a lowered position relative thereto, a part of said body being spaced from the nose of said flap to form therebetween a rearward directed slot, means defining a spanwise passage within said wing communicating with said slot and having an inlet radially inward of said wing, the surface of said passage being substantially closed to the influx of the relative wind and being relatively smooth and free of turbulence producing restrictions, power blower means within the aircraft in communication with said inlet to force a flow through said passage and out said slot to exert a rotative force on said wing, said slot being open when said flap is in its said normal position during high speed operation of said wing, said flap being shaped for cooperative relation with said body providing for selective variation in the exit area of said slot as the flap is moved from said normal position in either direction to vary the volume of flow through said exit.

EDWARD A. STALKER.